(12) United States Patent
Liu et al.

(10) Patent No.: US 7,605,570 B2
(45) Date of Patent: Oct. 20, 2009

(54) BRIDGELESS PFC CONVERTER WITH LOW COMMON-MODE NOISE AND HIGH POWER DENSITY

(75) Inventors: Teng Liu, Shanghai (CN); Xiaoni Xin, Shanghai (CN); Jianhong Zeng, Shanghai (CN); Jianping Ying, Shanghai (CN); Wei Zhao, Shanghai (CN)

(73) Assignee: Delta Electronics, Inc., Taoyuan Hsien (TW)

( * ) Notice: Subject to any disclaimer, the term of this patent is extended or adjusted under 35 U.S.C. 154(b) by 414 days.

(21) Appl. No.: 11/696,561

(22) Filed: Apr. 4, 2007

(65) Prior Publication Data

US 2007/0279955 A1  Dec. 6, 2007

(30) Foreign Application Priority Data

May 30, 2006  (TW) .............................. 95119246 A

(51) Int. Cl.
*H02M 1/12* (2006.01)
*H02M 7/12* (2006.01)

(52) U.S. Cl. .................... 323/207; 363/89; 363/127

(58) Field of Classification Search .............. 363/84, 363/89, 125, 127; 323/222, 223, 205, 207
See application file for complete search history.

(56) References Cited

U.S. PATENT DOCUMENTS

| 6,738,274 | B2* | 5/2004 | Prasad et al. | 363/70 |
| 7,215,560 | B2* | 5/2007 | Soldano et al. | 363/89 |
| 7,355,868 | B2* | 4/2008 | Soldano | 363/89 |

* cited by examiner

Primary Examiner—Gary L Laxton

(57) ABSTRACT

A bridgeless power factor correction converter that can reduce common-mode noise and enhance power density is made up of a boost inductor coupled to an input end, a bidirectional switch connected in series with the boost inductor, a first series rectifying circuit having a junction node connected between the boost inductor and the bi-directional switch, a second series rectifying circuit connected in parallel with the first series rectifying circuit and having a junction node coupled to the bi-directional switch, and an output capacitor connected in parallel with the second series rectifying circuit, in which the second series rectifying circuit is made up of slow-recovery diodes and the first series rectifying circuit is made up of fast-recovery diodes.

17 Claims, 10 Drawing Sheets

BRIDGELESS PFC CONVERTER WITH LOW COMMON-MODE NOISE AND HIGH POWER DENSITY

FIELD OF THE INVENTION

The present invention is related to a power factor correction converter, and more particularly to a bridgeless power factor correction converter capable of reducing common-mode noise and enhancing power density.

BACKGROUND OF THE INVENTION

Switching power supply is a power conversion circuit that uses switching operations to convert an input voltage waveform into a specific output voltage waveform. A boost converter is an example of switching power supply that can provide power factor correction and total harmonic distortion reduction to the input voltage and convert the input voltage into a stable and regulated output voltage.

FIG. 1 is a circuit diagram of a well-known power factor correction (PFC) boost converter according to the prior art. In FIG. 1, a bridge rectifier BR is connected to an input AC voltage Vin for converting the input AC voltage Vin into a full-wave rectified DC voltage. A boost inductor L11 is connected to an output terminal of the bridge rectifier BR, and configured to store energy therein by receiving a current from the bridge rectifier BR and release the stored energy to an output capacitor C11 through a rectifying diode D11 according to the on/off operations of a switch Q11. Therefore, an output DC voltage is generated across the output capacitor C11. The output DC voltage across the output capacitor C11 is provided to a load (not shown). However, the rectifying diodes that constitute the bridge rectifier BR are inevitable to cause considerable conduction loss. As a result, the conversion efficiency of the converter is degraded. Moreover, anytime the boost inductor L11 is storing energy or releasing energy, three power semiconductor devices within the converter have to turn on to conduct currents, which would aggravate the conduction loss suffered by the converter.

FIG. 2 is a circuit diagram of a totem-pole power factor correction boost converter. In FIG. 2, a boost inductor L21 is connected between an input terminal and a junction node between the transistor switches Q21 and Q22. The converter of FIG. 2 further includes rectifying diodes D21 and D22 which are connected in series with each other and connected in parallel with the transistor switches Q21 and Q22, in which the switching of the transistor switches Q21 and the switching of the transistor switches Q22 are conducted in a complementary manner. The operation of the converter of FIG. 2 is described as follows. During the positive half-cycle of the input voltage, the transistor switch Q21 is turned on and the rectifying diode D21 is reverse-biased, and the output voltage of the converter is regulated by modulating the transistor switch Q22. During the time interval of D (of a duty cycle associated with the positive half-cycle), the transistor switch Q22 is turned on to connect the boost inductor L21 to the input AC voltage Vin. In the meantime, the inductor current of the boost inductor L21 rises up and thereby storing energy in the boost inductor L21 during the time interval of D. During the time interval of 1-D (of a duty cycle associated with the positive half-cycle), the transistor switch Q22 is turned off. The boost inductor L21 releases the stored energy to the output capacitor C21 through the rectifying diode D22, and thereby generating an output voltage across the output capacitor C21. During the negative half-cycle of the input voltage, the transistor switch Q22 is turned on and the rectifying diode D22 is reverse-biased, and the output voltage of the converter is regulated by modulating the transistor switch Q21. During the time interval of D (of a duty cycle associated with the negative half-cycle), the transistor switch Q21 is turned on to connect the boost inductor L21 to the input AC voltage Vin. In the meantime, the inductor current of the boost inductor L21 rises up and thereby storing energy in the boost inductor L21 during the time interval of D. During the time interval of 1-D (of a duty cycle associated with the negative half-cycle), the transistor switch Q21 is turned off. The boost inductor L21 releases the stored energy to the output capacitor C21 through the rectifying diode D21, and thereby generating an output voltage across the output capacitor C21. It can be understood from the above descriptions that only two power semiconductor devices are required to turn on to conduct currents during the positive half-cycle or the negative half-cycle. Therefore, the conversion efficiency of the converter of FIG. 2 is quite high. Moreover, when the converter of FIG. 2 is operating in the continuous conduction mode (CCM), the rectifying diode D21 or D22 is able to interconnect one end of the input AC voltage Vin and the output capacitor C21, so that the common-mode noise of the converter is quite low. Nonetheless, the parasite diodes on the transistor switches Q21 and Q22 of the converter shown in FIG. 2 are configured to switch at a high frequency, and their reverse recovery characteristics are quite bad. In practical applications, the converter is prone to lose the advantage of low common-mode noise due to the high switching frequency or the persistent operation in discontinuous conduction mode (DCM).

FIG. 3 is a circuit diagram of a conventional bridgeless power factor correction converter. In FIG. 3, boost inductors L31, L32 are connected in parallel and respectively connected to one end of the input AC voltage vin. Transistor switches Q31, Q32 are respectively connected to the boost inductors L31, L32. Rectifying diodes D31, D32 are respectively connected in series with the transistor switches Q31, Q32. The rectifying diodes D31, D32 are connected to the output capacitor C31 through a first bus and the transistor switches Q31, Q32 are connected to the output capacitor C31 through a second bus. During the positive half-cycle of the input AC voltage Vin, the transistor switch Q31 is turned on and an input current is induced to flow toward the boost inductor L31 so as to charge the boost inductor L31. In the meantime, the transistor switch Q32 is also turned on and the current path is closed through the body diode of the transistor switch Q32. Next, the transistor switch Q31 is turned off and the energy stored in the boost inductor L31 is discharged to the output capacitor C31 through the rectifying diode D31. The current path is closed through the body diode of the transistor switch Q32. During the negative half-cycle of the input AC voltage Vin, the transistor switch Q32 is turned on and an input current is induced to flow toward the boost inductor L32 so as to charge the boost inductor L32. In the meantime, the transistor switch Q31 is also turned on and the current path is closed through the body diode of the transistor switch Q31. Next, the transistor switch Q32 is turned off and the energy stored in the boost inductor L32 is discharged to the output capacitor C31 through the rectifying diode D32. The current path is closed through the body diode of the transistor switch Q31. Hence, during each half-cycle of the input AC voltage Vin, one transistor switch acts as an active switch and the other transistor switch acts as a rectifying diode. The major disadvantage of the converter shown in FIG. 3 is that power bounce would occur between the input voltage and the output voltage. More disadvantageously, the common-mode noise would be augmented with the increase of the parasitical capacitance value between the buses and ground.

FIG. 4 is modified circuit diagram of the bridgeless power factor correction converter of FIG. 3. Compared to FIG. 3, the configuration and operation of the boost inductors L41, L42, the transistor switches Q41, Q42, the rectifying diodes D41, D42, and the output capacitor C41 of FIG. 4 are similar to the configuration and operation of the counterparts of FIG. 3. Particularly, the bridgeless PFC converter of FIG. 4 adds a pair of auxiliary diodes D43, D44 to the input side of the converter for efficiently suppressing the common-mode noise of the converter. Nonetheless, the boost inductors L41, L41 would cause a waste of circuit board space due to its bulky dimensions. Also, the boost inductors L41, L42 are operating in an alternate manner during the time period of the input AC voltage Vin, which would result in a low utilization of the boost inductors L41, L42 and become difficult to improve the power density.

There is a tendency to develop a bridgeless power factor correction converter that can reduce the common-mode noise of the converter and enhance the power density of the converter.

SUMMARY OF THE INVENTION

An object of the present invention is to provide a power factor correction circuit using a bridgeless boost converter to implement, which can reduce the common-mode noise existed in the circuit and enhance the power density of the converter.

According to a fundamental aspect of the present invention, a power factor correction converter is provided, which includes a boost inductor connected to an AC input terminal, a switch circuit connected in series with the boost inductor, a first series rectifier circuit having a junction node connected between the boost inductor and the switch circuit, a second series rectifier circuit connected in parallel with the first series rectifier circuit and having a junction node connected to the switch circuit, and an output capacitor connected in parallel with the second series rectifier circuit, wherein the first series rectifier circuit is implemented by rectifying diodes having a fast reverse recovery characteristic and the second series rectifier circuit is implemented by rectifying diodes having a slow reverse recovery characteristic.

According to an advanced aspect of the present invention, a power factor correction converter is provided, which includes a first power converter stage, a second power converter stage, and an output capacitor, wherein the first power converter stage includes a first boost inductor connected to an AC input terminal, a first switch circuit connected in series with the first boost inductor, a first series rectifier circuit having a junction node connected between the first boost inductor and the first switch circuit, and a second series rectifier circuit connected in parallel with the first series rectifier circuit and having a junction node connected to the first switch circuit. The second power converter stage includes a second boost inductor connected to the AC input terminal and connected in parallel with the first boost inductor, a second switch circuit connected between the second boost inductor and the first switch circuit, and a third series rectifier circuit connected in parallel with the second series rectifier circuit and the output capacitor and having a junction node connected between the second boost inductor and the second switch circuit, wherein the first series rectifier circuit and the third series rectifier circuit are implemented by rectifying diodes having a fast reverse recovery characteristic and the second series rectifier circuit is implemented by rectifying diodes having a slow reverse recovery characteristic.

According to another advanced aspect of the present invention, a power factor correction converter is provided, which includes a first power converter stage, a second power converter stage, and an output capacitor, wherein the first power converter stage includes a first boost inductor connected to an AC input terminal, a first switch circuit connected in series with the first boost inductor, a first series rectifier circuit having a junction node connected between the first boost inductor and the first switch circuit, and a second series rectifier circuit connected in parallel with the first series rectifier circuit and having a junction node connected to the first switch circuit. The second power converter stage includes a second boost inductor connected to the AC input terminal and connected in parallel with the first boost inductor, a second switch circuit connected in series with the second boost inductor, a third series rectifier circuit having a junction node connected between the second boost inductor and the second switch circuit, and a fourth connected in parallel with the third series rectifier circuit and the output capacitor and having a junction node connected to the second switch circuit, wherein the first series rectifier circuit and the third series rectifier circuit are implemented by rectifying diodes having a fast reverse recovery characteristic and the second series rectifier circuit and the fourth series rectifier circuit are implemented by rectifying diodes having a slow reverse recovery characteristic.

Now the foregoing and other features and advantages of the present invention will be best understood through the following descriptions with reference to the accompanying drawings, wherein:

DETAILED DESCRIPTION OF THE PREFERRED EMBODIMENT

Several preferred embodiments embodying the features and advantages of the present invention will be expounded in following paragraphs of descriptions. It will be understood that the present invention could be realized with various modification in different respects, all of which are without departing from the scope of the present invention, and the description herein and the drawings are to be taken as illustrative in nature, but not to be taken as limitative.

Figure 5:
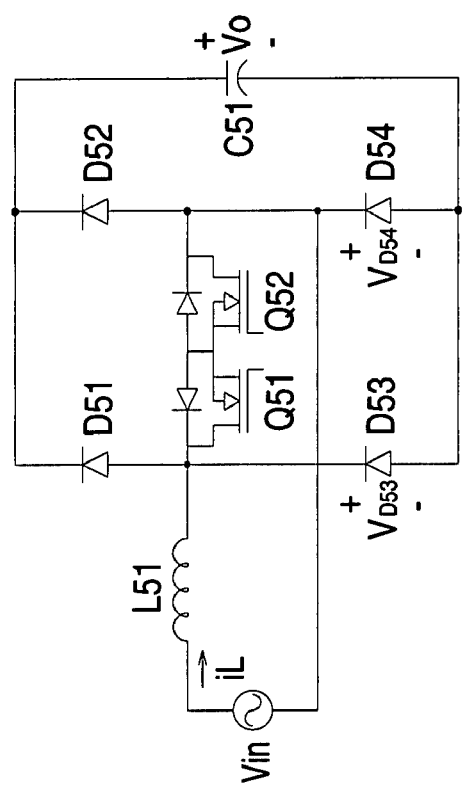
FIG. 5 is a diagrammatic view showing the circuitry of a bridgeless power factor correction converter according to a first preferred embodiment of the present invention.

FIG. 5 shows a bridgeless power factor correction converter according to a first preferred embodiment of the present invention. The converter shown in FIG. 5 includes a boost inductor L51 connected to an input terminal, and a bidirectional switch (Q51, Q52) implemented by MOS transistors and connected in series with the boost inductor L51. The converter of FIG. 5 further includes a first series rectifier circuit formed by rectifying diodes D51 and D53, in which a junction node between the rectifying diodes D51 and D53 is connected between the boost inductor L51 and the bidirectional switch (Q51, Q52), and a second series rectifier circuit formed by rectifying diodes D52 and D54 and connected in parallel with the first series rectifier circuit, in which a junction node between the rectifying diodes D52 and D54 is connected to the bidirectional switch (Q51, Q52).

Figure 10:
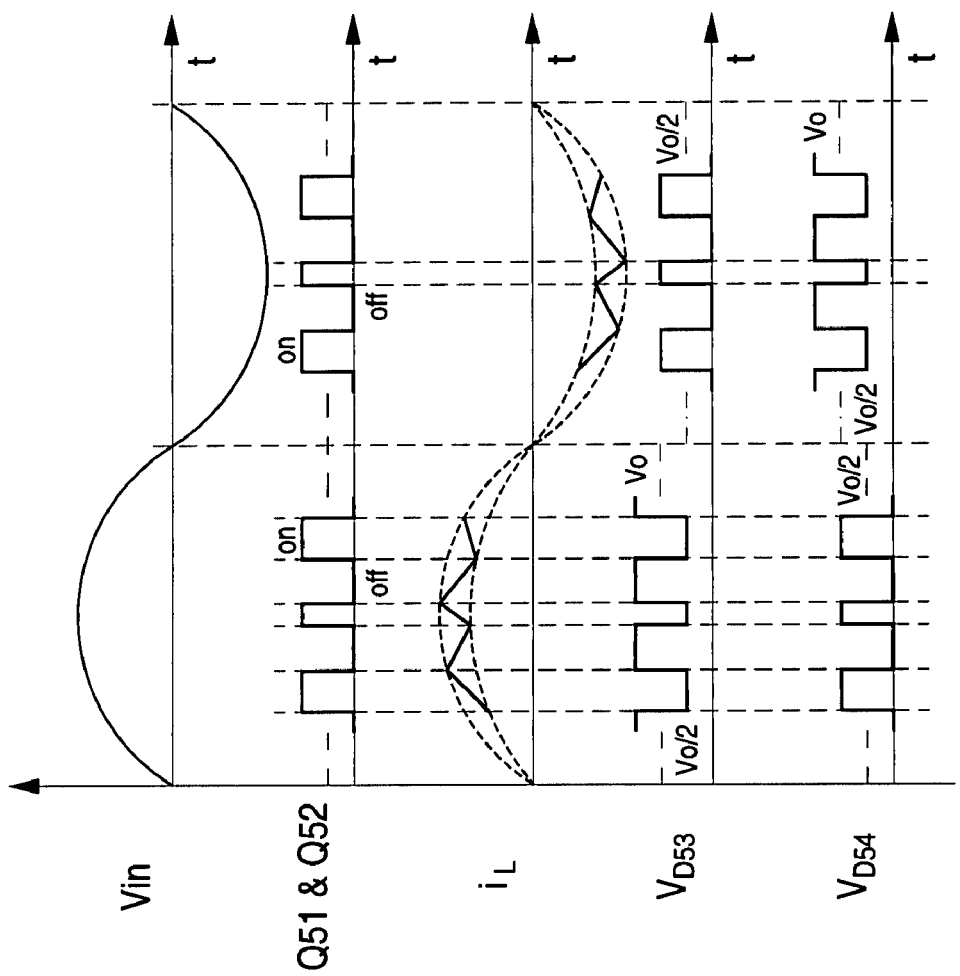
FIG. 10 is a waveform diagram showing the waveforms of the input AC voltage Vin, the switching signals of the bidirectional switch Q51, Q52, the inductor current iL, and the voltages $V_{D53}$, $V_{D54}$ across the rectifying diodes D53, D54 that are measured according to the converter of FIG. 5, wherein the rectifying diodes D51, D52, D53, D54 are not implemented by specific diodes.

The operation of the converter of FIG. 5 is described as follows. During the positive half-cycle of the input AC voltage Vin, the boost inductor L51 is configured to perform boosting and rectification operations to the input AC voltage Vin through charging and discharging operation with the input current. During the ON period of the bidirectional switch (Q51, Q52), the boost inductor L51 is placed across the input AC voltage Vin. In the meantime, the inductor current of the boost inductor L51 ramps up and thereby storing energy in the boost inductor L51. During the OFF period of the bidirectional switch (Q51, Q52), the boost inductor L51 discharge the stored energy to the output capacitor C51 through the rectifying diodes D51 and D54, thereby generating an output voltage Vo across the output capacitor C51. During the negative half-cycle of the input AC voltage Vin, the boost inductor L51 is configured to perform boosting and rectification operations to the input AC voltage Vin through charging and discharging operation using the input current. During the ON period of the bidirectional switch (Q51, Q52), the boost inductor L51 is placed across the input AC voltage Vin. In the meantime, the inductor current of the boost inductor L51 ramps up and thereby storing energy in the boost inductor L51. During the OFF period of the bidirectional switch (Q51, Q52), the boost inductor L51 discharge the stored energy to the output capacitor C51 through the rectifying diodes D52 and D53, thereby generating an output voltage Vo across the output capacitor C51. FIG. 10 is a waveform diagram showing the waveforms of the input AC voltage Vin, the switching control signals of the bidirectional switch (Q51, Q52), the inductor current iL, and the voltages $V_{D53}$, $V_{D54}$ across the rectifying diodes D53, D54, in which the rectifying diodes D51, D52, D53, D54 are not implemented by specific diodes.

Figures 1, 2:
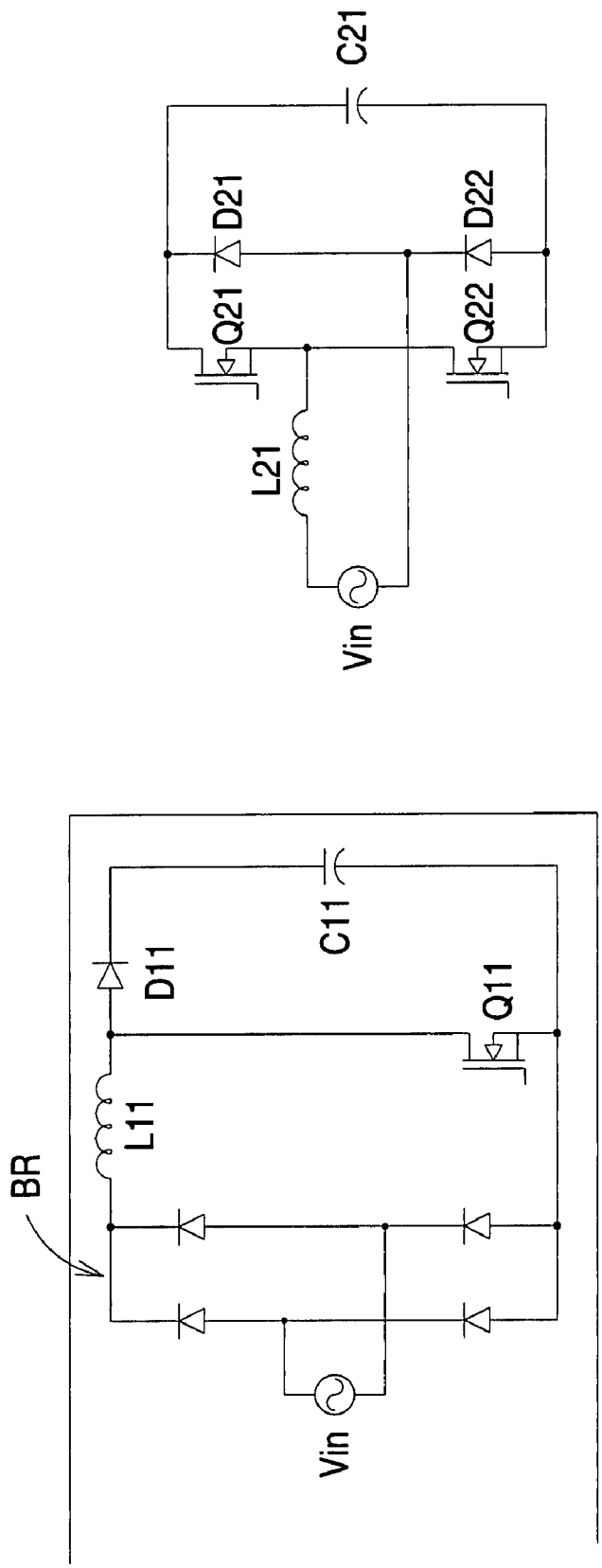
FIG. 1 is a diagrammatic view showing the circuitry of a well-known power factor correction boost converter according to the prior art.
FIG. 2 is a diagrammatic view showing the circuitry of a totem-pole power factor correction boost converter according to the prior art.
Figure 4:
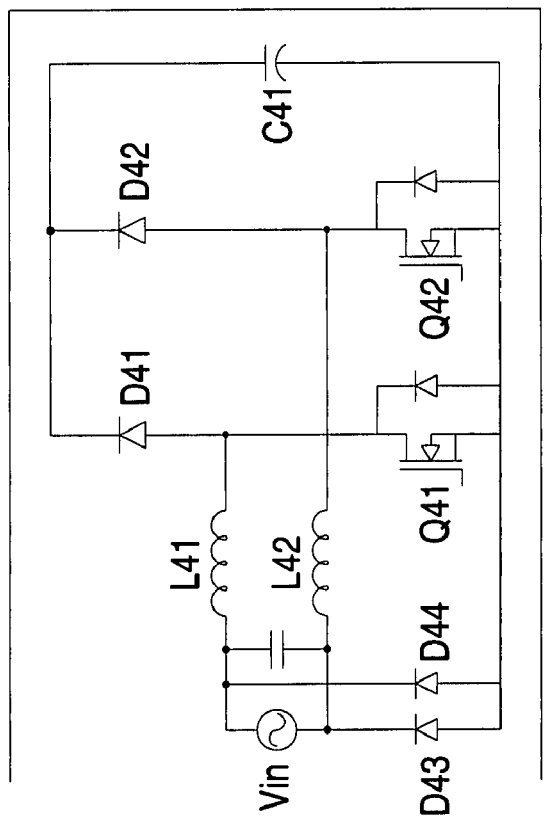
FIG. 4 is a diagrammatic view showing the modified circuitry of the bridgeless power factor correction converter of FIG. 3 according to the prior art.
Figure 3:
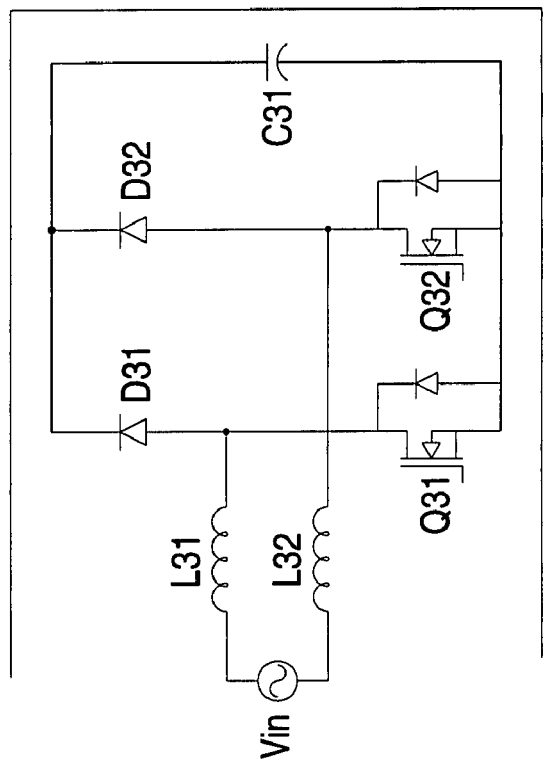
FIG. 3 is a diagrammatic view showing the circuitry of a bridgeless power factor correction converter according to the prior art.

As can be known from the above statements, the converter of FIG. 5 allows only two power semiconductor devices to turn on to conduct currents during the positive half-cycle or the negative half-cycle of the input AC voltage, which is similar to the case discussed in the examples of FIG. 2 and FIG. 3. Therefore, the converter of FIG. 5 also bears the advantages of low conduction loss.

In practical applications, the converter of FIG. 5 is inevitable to suffer from the disadvantage of high common-mode noise. The cause of such high common-mode noise is the power bounce occurred between the input voltage Vin and the output voltage Vo. Referring to FIG. 5, during the positive half-cycle of the input AC voltage Vin and while the bidirectional switch (Q51, Q52) is turned off, the input current flows through the boost inductor L51 and the rectifying diodes D51 and D54. Therefore, the voltage $V_{D54}$ across the rectifying diodes D54 should be zero. When the state of bidirectional switch (Q51, Q52) transits from OFF to ON, it can be seen from the timing diagram of FIG. 9 that the voltage at the cathode of the rectifying diodes D54, that is, the voltage at the anode of the rectifying diodes D52, is floating. Under this condition, power bounce may occur across the rectifying diodes D52 and across the rectifying diodes D54. If the rectifying diodes D51, D52, D53, D54 all have the same switching character, the magnitude of this power bounce would reach ½ Vo. Hence, this power bounce can be identified as the common-mode noise.

In order to obviate this disadvantage, the present invention chooses the rectifying diodes D51, D52, D53, D54 with specific character so as to eliminate such nuisance. In the present embodiment, the rectifying diodes D52 and D54 of the second series rectifier circuit are implemented by rectifying diodes having a slow reverse recovery characteristic, and the rectifying diodes D51 and D53 of the first series rectifier circuit are implemented by rectifying diodes having a fast reverse recovery characteristic. For the adoption of the rectifying diodes having a slow reverse recovery characteristic to implement the second series rectifier circuit, the ON state of the rectifying diodes D52 and D54 of the second series rectifier circuit can be sustained when the state of the bidirectional switch (Q51, Q52) transits from OFF to ON. Therefore, the voltage across the rectifying diode D52 and the voltage across the rectifying diode D54 can keep zero and thus the electromagnetic interference caused by power bounce can be eliminated.

Figure 11:
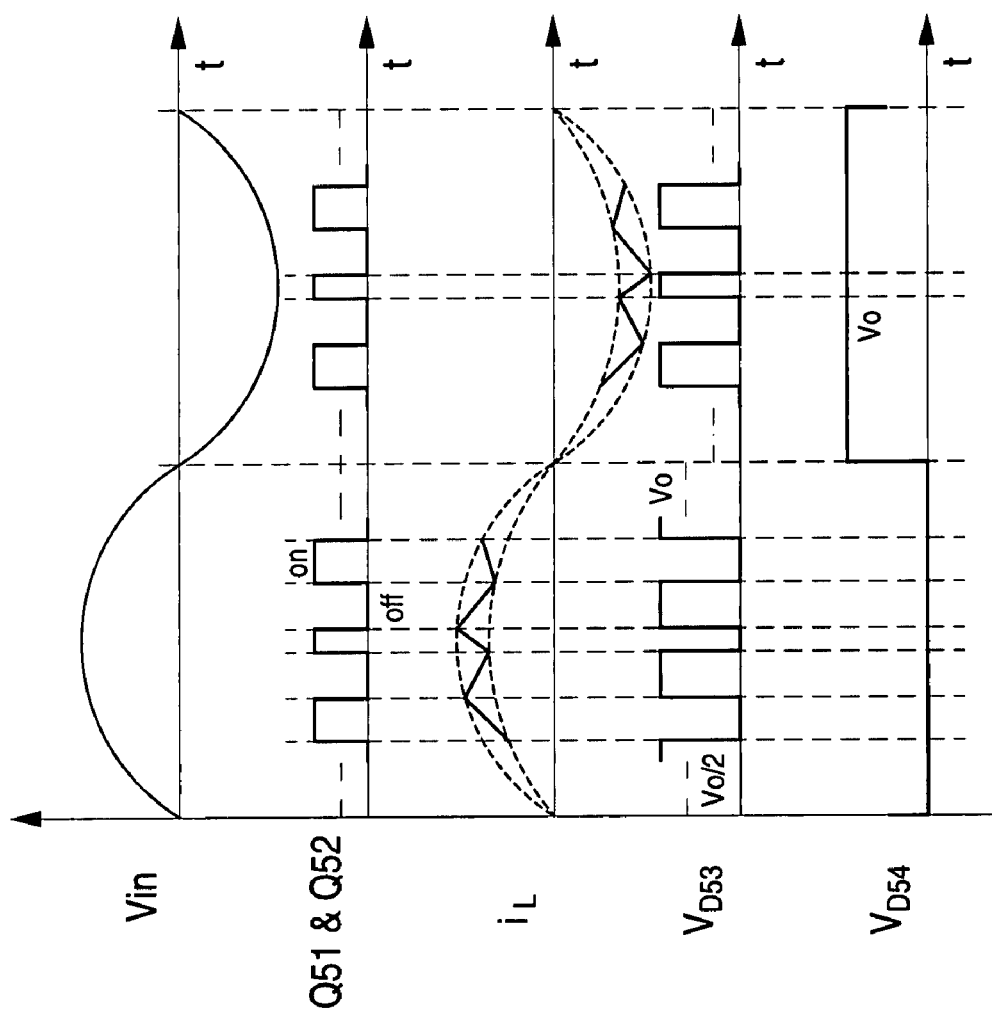
FIG. 11 is a waveform diagram showing the waveforms of the input AC voltage Vin, the switching signals of the bidirectional switch Q51, Q52, the inductor current iL, and the voltages $V_{D53}$, $V_{D54}$ across the rectifying diodes D53, D54 that are measured according to the converter of FIG. 5, wherein the rectifying diodes D52 and D54 of the second series rectifier circuit are implemented rectifying diodes having a slow reverse recovery characteristic and rectifying diodes D51 and D53 of the first series rectifier circuit are implemented rectifying diodes having a fast reverse recovery characteristic.

Next, the principle of eliminating power bounce through the foregoing arrangement of the rectifying diodes will be described. During the positive half-cycle of the input AC voltage while the bidirectional switch (Q51, Q52) is turned off, the rectifying diode D51 having a fast reverse recovery characteristic and the rectifying diode D54 having a slow reverse recovery characteristic are turned on, so that the stored energy of the boost indictor L51 is discharged to the output capacitor C51 through the rectifying diodes D51 and D54. Therefore, an output voltage Vo is generated across the output capacitor C51. When the state of the bidirectional switch (Q51, Q52) transits from OFF to ON, the boost inductor L51 stores energy therein by the input current, and the output voltage Vo acts as a reverse bias voltage which is applied to the rectifying diodes D51 and D54. This reverse bias voltage takes the rectifying diodes D51 and D54 into a reverse recovery process. Because the rectifying diode D51 is a diode having a fast reverse recovery characteristic, it will readily recover to the OFF state and completely bear the reverse bias voltage. However, the rectifying diode D54 which is a diode having a slow reverse recovery characteristic can not complete the reverse recovery process and sustain the ON state after the rectifying diode D51 is recovered. Therefore, the rectifying diode D54 will not bear the counter voltage during the phase when the boost inductor L51 is storing energy. FIG. 11 is a timing diagram showing the waveforms of the input AC voltage Vin, the switching control signals of the bidirectional switch (Q51, Q52), the inductor current iL, and the voltages $V_{D53}$, $V_{D54}$ across the rectifying diodes D53, D54, in which the rectifying diodes D52 and D54 of the second series rectifier circuit adopt rectifying diodes having a slow reverse recovery characteristic and the rectifying diodes D51 and D53 are implemented with rectifying diodes having a fast reverse recovery characteristic. It can be seen from FIG. 10 that the voltage across the rectifying diode D52 having a slow reverse recovery characteristic will keep zero during the positive half-cycle of the input AC voltage Vin, and thereby eliminating the power bounce across the rectifying diode D52. Also, it can be understood from the waveform of the voltage $V_{D54}$ across the rectifying diode D54 as shown in FIG. 11 that the rectifying diode D54 is modulated in the manner of low-frequency switching instead of high-frequency switching, and thus the high-frequency electromagnetic interference can be avoided. It is noteworthy that the switching frequency of the rectifying diodes D51, D53 having a fast reverse recovery characteristic is the same with the switching frequency of the bidirectional switch (Q51, Q52), and the switching frequency of the rectifying diodes D52, D54 having a slow reverse recovery characteristic is the same with the frequency of the input AC voltage Vin. Also, the reverse recovery time of the rectifying diodes D52, D54 having a slow reverse recovery characteristic is longer than the double of the reverse recovery time of the rectifying diodes D51, D53 having a fast reverse recovery characteristic.

Figure 6:
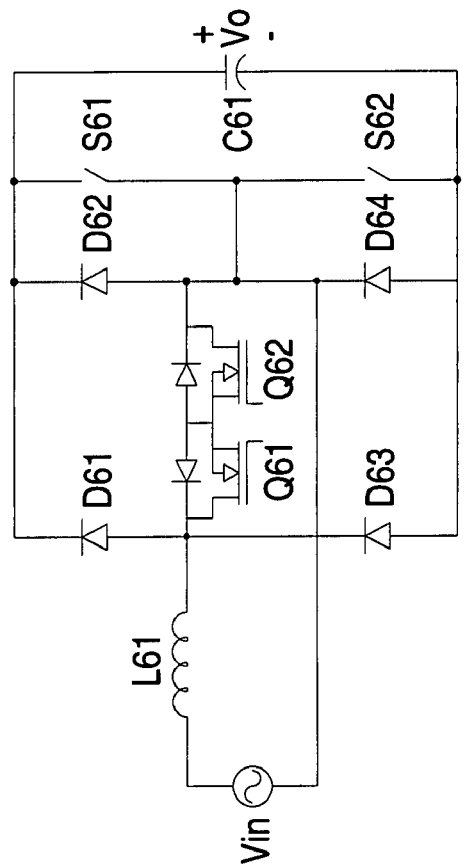
FIG. 6 is a diagrammatic view showing the circuitry of a bridgeless power factor correction converter according to a second preferred embodiment of the present invention.

FIG. 6 is a circuit diagram of the bridgeless power factor correction converter according to a second embodiment of the present invention. The configuration and operation of the boost inductor L61, the bidirectional switch (Q61, Q62), the first series rectifier circuit (D61, D63), the second series rectifier circuit (D62, D64), and the output capacitor C61 are the same with the configuration and operation of the boost inductor L51, the bidirectional switch (Q51, Q52), the first series rectifier circuit (D51, D53), the second series rectifier circuit (D52, D54), and the output capacitor C51 of FIG. 5, and it is not intended to give details herein. Compared with FIG. 5, the converter of FIG. 6 adds a pair of auxiliary switches (S61, S62) which are connected in parallel with the second series rectifier circuit (D62, D64) and configured to switch in synchronization with the frequency of the input AC voltage Vin and thereby suppressing the common-mode noise of the converter with better efficiency.

Figure 7:
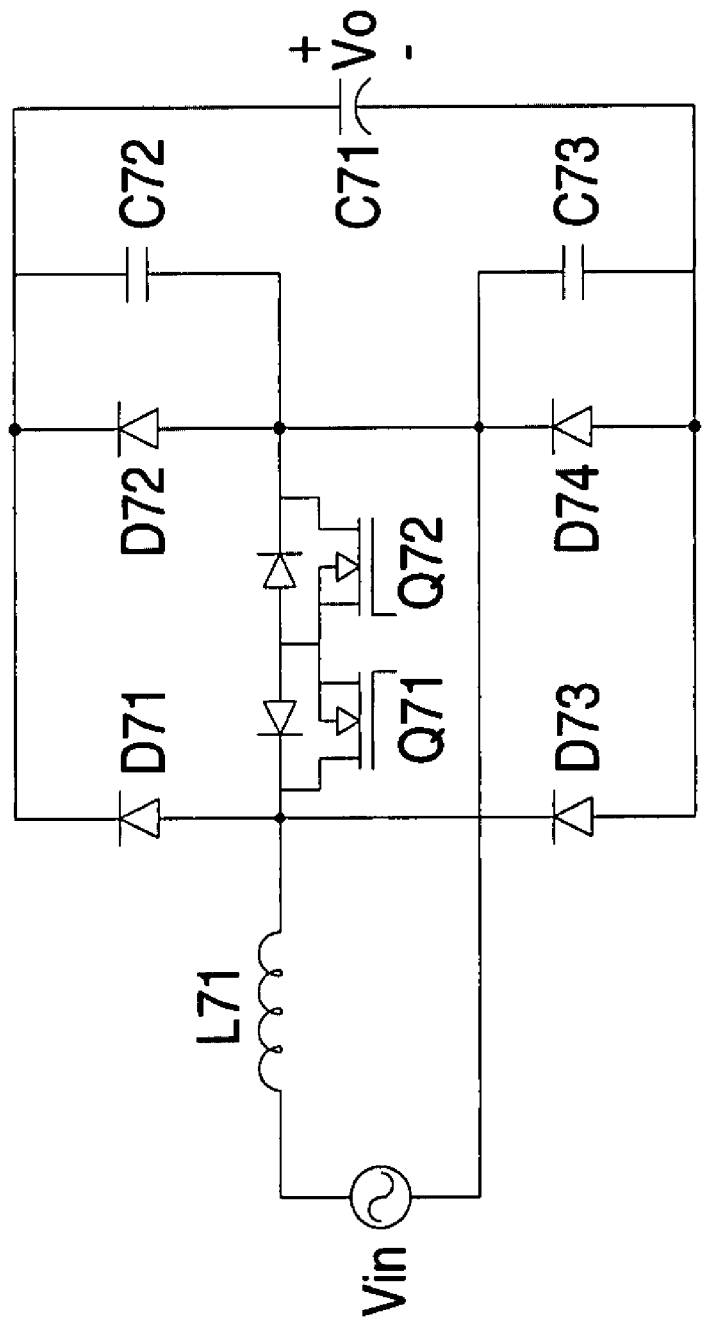
FIG. 7 is a diagrammatic view showing the circuitry of a bridgeless power factor correction converter according to a third preferred embodiment of the present invention.

FIG. 7 is a circuit diagram of the bridgeless power factor correction converter according to a third embodiment of the present invention. The configuration and operation of the boost inductor L71, the bidirectional switch (Q71, Q72), the first series rectifier circuit (D71, D73), the second series rectifier circuit (D72, D74), and the output capacitor C71 are the same with the configuration and operation of the boost inductor L51, the bidirectional switch (Q51, Q52), the first series rectifier circuit (D51, D53), the second series rectifier circuit (D52, D54), and the output capacitor C51 of FIG. 5, and it is not intended to give details herein. Compared with FIG. 5, the converter of FIG. 7 adds a pair of auxiliary capacitors (C72, C73) which are connected in parallel with the second series rectifier circuit (D72, D74) and configured to further suppress the common-mode noise by its low-impedance characteristics at high frequencies. Alternatively, with the equivalent characteristic of the capacitor at high frequencies, only one auxiliary capacitor is needed to be connected in parallel with the second series rectifier circuit (D72, D74) so as to effectively suppress the power bounce occurred to the second series rectifier circuit (D72, D74).

Figure 8:
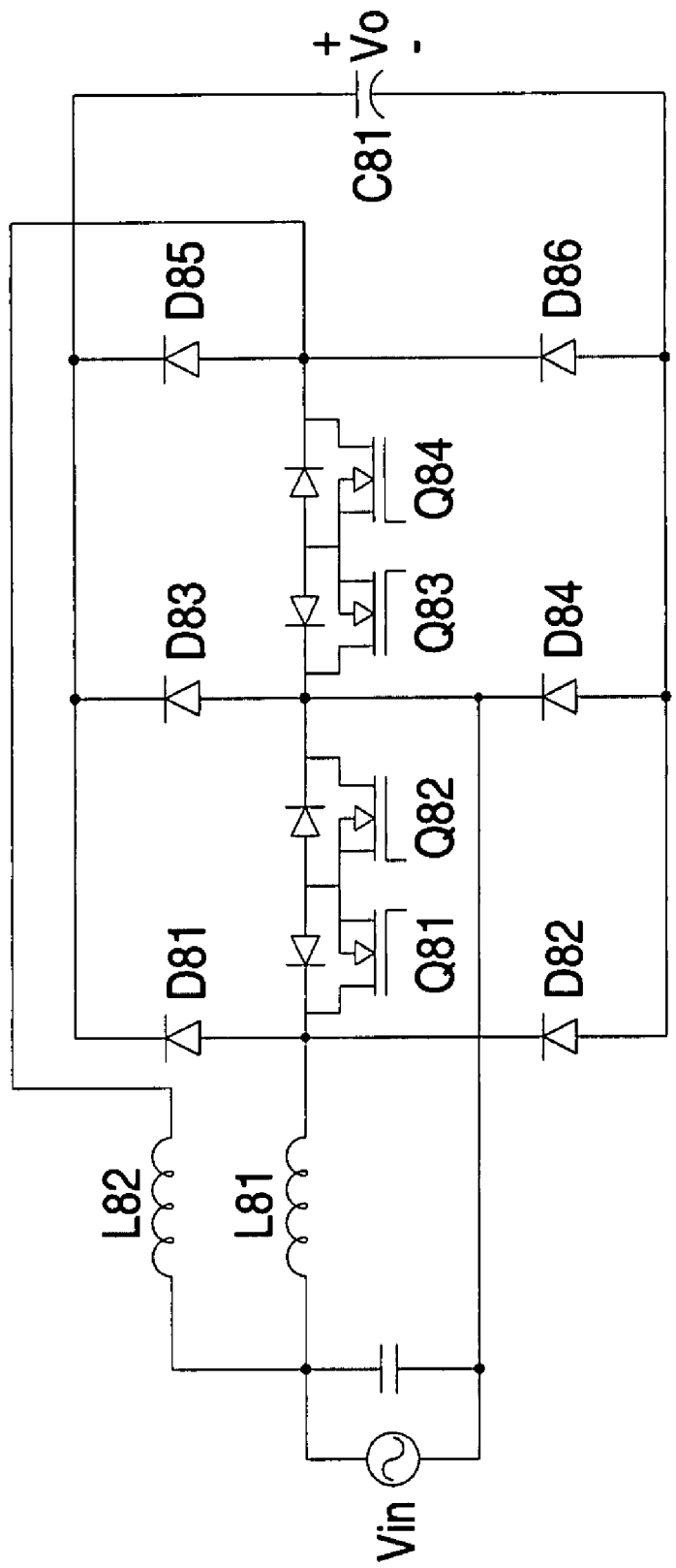
FIG. 8 is a diagrammatic view showing the circuitry of a bridgeless power factor correction converter according to a fourth preferred embodiment of the present invention.

FIG. 8 is a circuit diagram of the bridgeless power factor correction converter according to a fourth embodiment of the present invention. The bridgeless power factor correction converter of FIG. 8 is an interleaved power converter circuit, in which a first boost inductor L81, a first bidirectional switch (Q81, Q82), a first series rectifier circuit (D81, D82), and a second series rectifier circuit (D83, D84) form a first power converter stage having the same topology with the bridgeless power factor correction converter of FIG. 5, and a second first boost inductor L82, a second bidirectional switch (Q83, Q84), a third series rectifier circuit (D85, D86), and the second series rectifier circuit (D83, D84) form a second power converter stage having the same topology with the bridgeless power factor correction converter of FIG. 5. The bridgeless power factor correction converter of FIG. 8 is derived by interleaving a bridgeless power factor correction converter of FIG. 5 with another bridgeless power factor correction converter of FIG. 5, in which the first boost inductor L81 is connected in parallel with the second boost inductor L82 and the output capacitor C81 is connected in parallel with the third series rectifier circuit (D85, D86). It is to be noted that the second series rectifier circuit (D83, D84) of the first power converter stage is shared with the second power converter stage and acts as a series rectifier circuit for the second power converter stage. The second series rectifier circuit (D83, D84) are implemented by rectifying diodes having a slow reverse recovery characteristic, whereas the first series rectifier circuit (D81, D82) and the third series rectifier circuit (D85, D86) are implemented by rectifying diodes having a fast reverse recovery characteristic, and the switching of the first bidirectional switch (Q81, Q82) and the switching of the second bidirectional switch (Q83, Q84) are conducted in an alternate manner.

Figure 9:
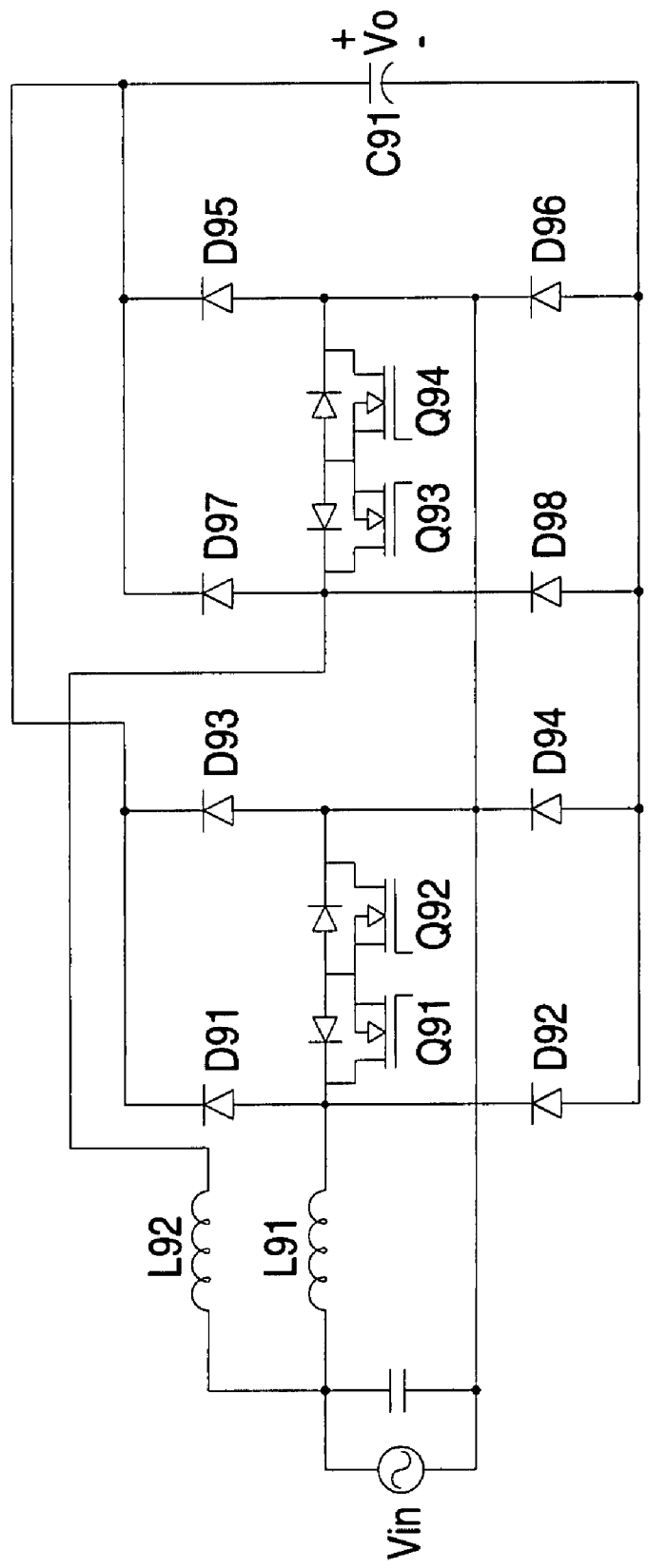
FIG. 9 is a diagrammatic view showing the circuitry of a bridgeless power factor correction converter according to a fifth preferred embodiment of the present invention.

FIG. 9 is a circuit diagram of the bridgeless power factor correction converter according to a fifth embodiment of the present invention. The bridgeless power factor correction converter of FIG. 9 is a modification of the bridgeless power factor correction converter of FIG. 8, in which a first boost inductor L91, a first bidirectional switch (Q91, Q92), a first series rectifier circuit (D91, D92), and a second series rectifier circuit (D93, D94) form a first power converter stage having the same topology with the bridgeless power factor correction converter of FIG. 5, and a second first boost inductor L92, a second bidirectional switch (Q93, Q94), a third series rectifier circuit (D97, D98), and a fourth series rectifier circuit (D95, D96) form a second power converter stage having the same topology with the bridgeless power factor correction converter of FIG. 5. The bridgeless power factor correction converter of FIG. 9 is derived by combining two bridgeless power factor correction converters of FIG. 5 together in an interlaced manner, in which the first boost inductor L91 is connected in parallel with the second boost inductor L92 and the output capacitor C91 is connected in parallel with the fourth series rectifier circuit (D95, D96). It is to be noted that the second series rectifier circuit (D93, D94) and the fourth series rectifier circuit (D95, D96) are implemented by rectifying diodes having a slow reverse recovery characteristic, whereas the first series rectifier circuit (D91, D92) and the third series rectifier circuit (D97, D98) are implemented by rectifying diodes having a fast reverse recovery characteristic, and the switching of the first bidirectional switch (Q91, Q92) and the switching of the second bidirectional switch (Q93, Q94) are conducted in an alternate manner.

Although the high-frequency power bounce can be effectively suppressed by employing diodes having a slow reverse recovery characteristic to implement the second series rectifier circuit (D52, D54) of FIG. 5, the power bounce may be still unsuppressed under some conditions. In the case that the converter is working in a light-load or no-load condition and the input current is relatively small, the rectifying diodes D52 and D54 can not conduct normally in a switching duty cycle and thus a high-frequency power bounce is generated across the rectifying diode D54. In order to obviate such deficiency, two possible schemes are presented herein to eliminate the power bounce generated across the rectifying diode D54 when the converter is working in a light-load or no-load condition.

Figure 12:
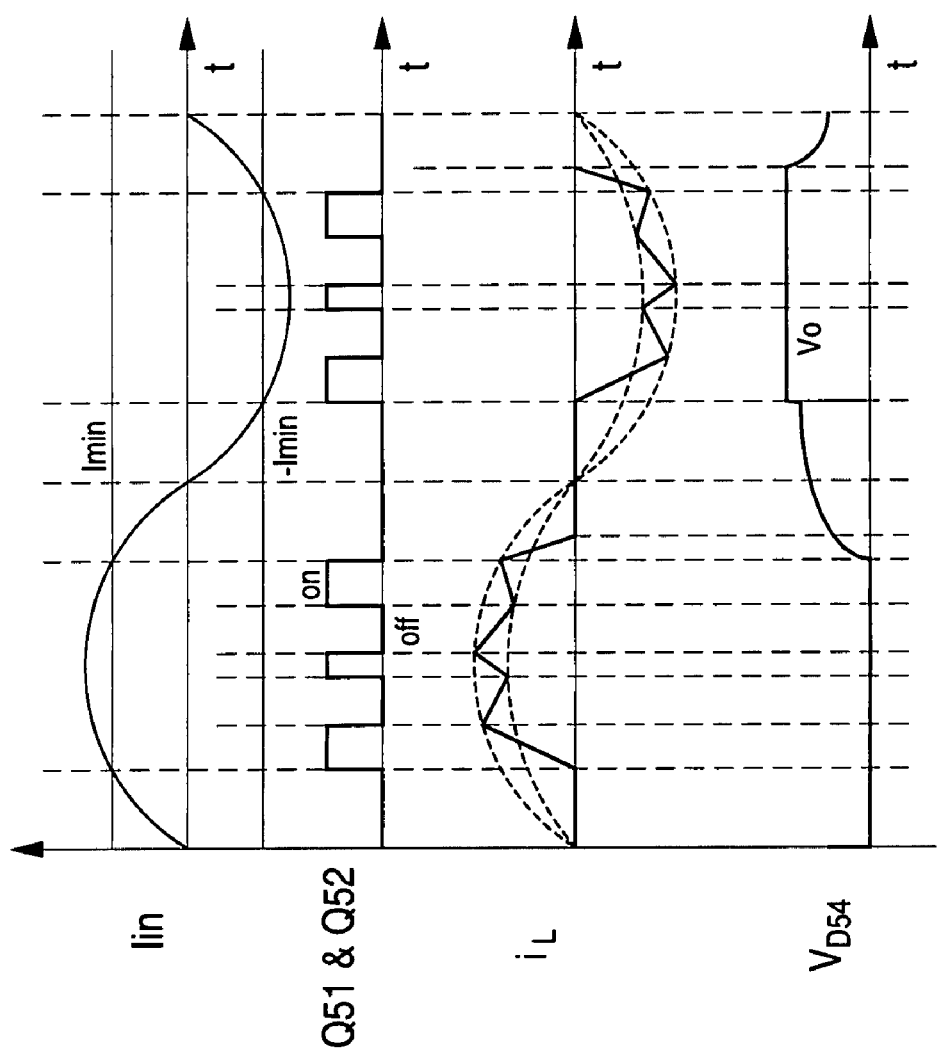
FIG. 12 is a waveform diagram showing the waveforms of the input current Iin, the switching control signals of the bidirectional switch (Q51, Q52), the inductor current iL, and the voltages $V_{D54}$ across the rectifying diode D54 by using an input current detection scheme to eliminate the power bounce.

FIG. 12 is a waveform diagram showing the waveforms of the input current Iin, the switching control signals of the bidirectional switch (Q51, Q52), the inductor current iL, and the voltages $V_{D54}$ across the rectifying diode D54 by using an input current detection scheme to eliminate the power bounce generated across the rectifying diode D54 when the converter is working in a light-load or no-load condition. When the input current Iin is relatively small, the bidirectional switch (Q51, Q52) ceases switching operation and the converter is working in an uncontrolled rectifying mode. Therefore, no high-frequency power bounce will occur under this condition. When the input current Iin is relatively large, the bidirectional switch (Q51, Q52) starts switching operation and series rectifier circuits are working as controlled rectifiers. As shown in FIG. 12, the voltage $V_{D54}$ across the rectifying diode D54 does not include high-frequency power bounce. Therefore, through the detection of the input current to regulate the rectification of the series rectifier circuits, the power bounce generated across the rectifying diode D54 when converter is working in a light-load or no-load condition can be eliminated.

Figure 13:
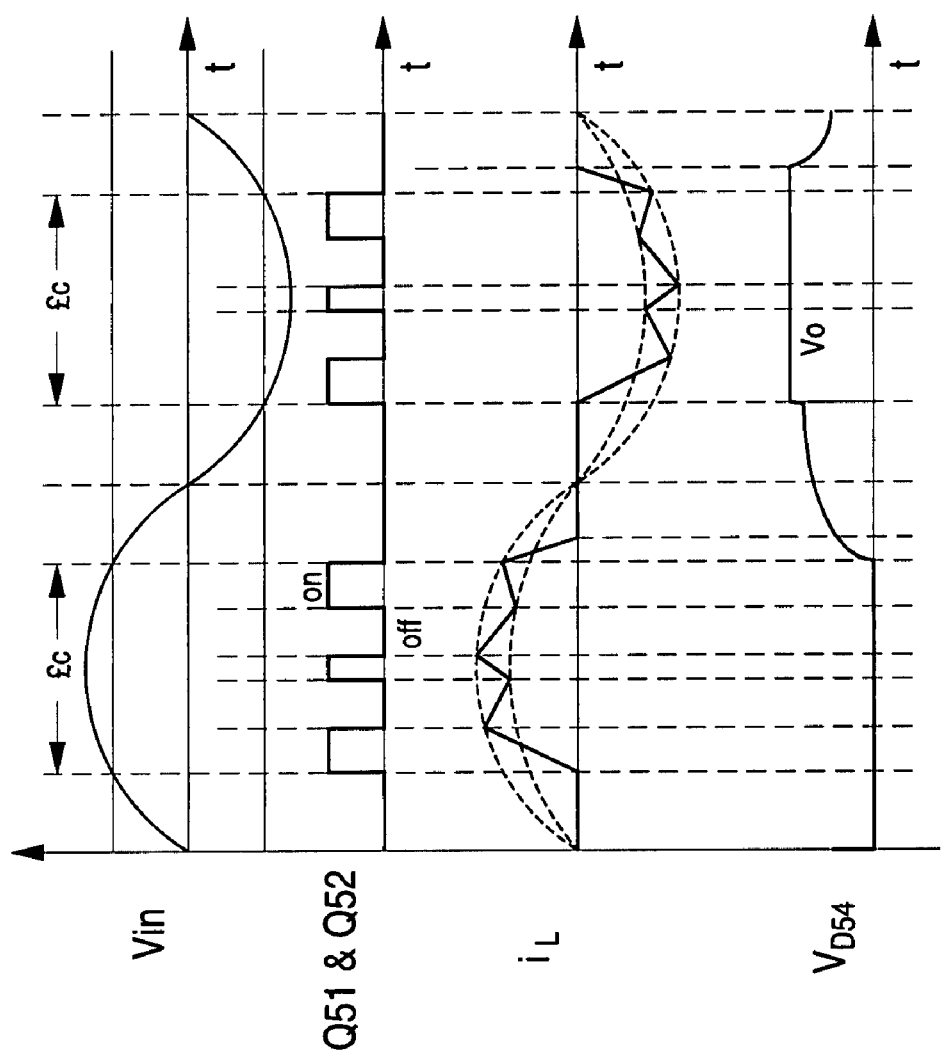
FIG. 13 is a waveform diagram showing the waveforms of the input AC voltage Vin, the switching control signals of the bidirectional switch Q51, Q52, the inductor current iL, and the voltages $V_{D54}$ across the rectifying diode D54 by using a conduction angle control scheme to eliminate the power bounce.

FIG. 13 is a waveform diagram showing the waveforms of the input AC voltage Vin, the switching control signals of the bidirectional switch (Q51, Q52), the inductor current iL, and the voltages $V_{D54}$ across the rectifying diode D54 by using a conduction angle control scheme to eliminate the power bounce generated across the rectifying diode D54 when the converter is working in a light-load or no-load condition. When the input voltage Vin is relatively low, the bidirectional switch (Q51, Q52) ceases switching operation and the converter is working in an uncontrolled rectifying mode. Therefore, no high-frequency power bounce will occur under this condition. When the input voltage vin is relatively large, the bidirectional switch (Q51, Q52) starts switching operation and series rectifier circuits are working as controlled rectifiers. As can be seen from the waveforms of FIG. 13, the voltage $V_{D54}$ across the rectifying diode D54 does not cause high-frequency power bounce. Therefore, through the control of the conduction angle θ of the input voltage to regulate the rectification of the series rectifier circuits, the power bounce generated across the rectifying diode D54 when converter is working in a light-load or no-load condition can be eliminated.

In conclusion, the bridgeless power factor correction converter according to the present invention configures at least two series rectifier circuits to perform rectification to the current outputted from the boost inductor, in which the first series rectifier circuit connected across the input terminals and the output terminals adopts rectifying diodes having a slow reverse recovery characteristic, and the other series rectifier circuit adopts rectifying diodes having a fast reverse recovery characteristic. Accordingly, when the state of the switch circuit of the bridgeless power factor correction converter transits from OFF to ON, the reverse recovery time of the working diodes within the first series rectifier circuit will be long enough to keep the ON state until the next switching cycle. Hence, the working diodes within the series rectifier circuit connected across the input terminals and the output terminals can keep conducting and maintain the voltage across the working diodes at zero, and thereby suppressing the power bounce occurred in the circuit nodes across the working diodes and reducing the common-mode noise generated in the converter.

Those of skilled in the art will recognize that these and other modifications can be made within the spirit and scope of the present invention as further defined in the appended claims.

What is claimed is:

1. A power factor correction converter, comprising:
a boost inductor connected to an AC input terminal;
a switch circuit connected in series with the boost inductor;
a first series rectifier circuit having a junction node connected between the boost inductor and the switch circuit;
a second series rectifier circuit connected in parallel with the first series rectifier circuit and having a junction node connected to the switch circuit; and
an output capacitor connected in parallel with the second series rectifier circuit;
wherein the first series rectifier circuit comprises rectifying diodes having a fast reverse recovery characteristic, and the second series rectifier circuit comprises rectifying diodes having a slow reverse recovery characteristic.

2. The power factor correction converter according to claim 1 wherein the switch circuit comprises a bidirectional switch.

3. The power factor correction converter according to claim 2 wherein the bidirectional switch is made up of metal-oxide-semiconductor field effect transistors.

4. The power factor correction converter according to claim 1 further comprising a pair of auxiliary switches connected in parallel with the second series rectifier circuit and configured to perform switching operations in synchronization with the frequency of an AC input of the power factor correction converter.

5. The power factor correction converter according to claim 1 further comprising at least one auxiliary capacitor connected in parallel with the second series rectifier circuit and configured to perform filtering operations to the voltage across the second series rectifier circuit.

6. The power factor correction converter according to claim 1 wherein the switching frequency of the rectifying diodes having a fast reverse recovery characteristic is the same with the switching frequency of the switch circuit, and the switching frequency of the rectifying diodes having a slow reverse recovery characteristic is the same with the operating frequency of the input voltage of the power factor correction converter.

7. The power factor correction converter according to claim 1 wherein the reverse recovery time of the rectifying diodes having a slow reverse recovery characteristic is more than two times longer than the double of the reverse recovery time of the rectifying diodes having a fast reverse recovery characteristic.

8. The power factor correction converter according to claim 1 wherein the switch circuit is configured to cease switching operation when an input current is relatively small and start switching operation when the input current is relatively large.

9. The power factor correction converter according to claim 1 wherein the switch circuit is configured to cease switching operation when an input voltage is relatively small and start switching operation when the input voltage is relatively large.

10. A power factor correction converter, comprising:
 a first power converter stage, comprising:
  a first boost inductor connected to an AC input terminal;
  a first switch circuit connected in series with the first boost inductor;
  a first series rectifier circuit having a junction node connected between the first boost inductor and the first switch circuit; and
  a second series rectifier circuit connected in parallel with the first series rectifier circuit and having a junction node connected to the first switch circuit;
 a second power converter stage, comprising:
  a second boost inductor connect to the AC input terminal and connected in parallel with the first boost inductor;
  a second switch circuit connected between the second boost inductor and the first switch circuit; and
  a third series rectifier circuit connected in parallel with the second series rectifier circuit and having a junction node connected between the second boost inductor and the second switch circuit; and
 an output capacitor connected in parallel with the third series rectifier circuit;
 wherein the first series rectifier circuit and the third series rectifier circuit comprise rectifying diodes having a fast reverse recovery characteristic, and the second series rectifier circuit comprises rectifying diodes having a slow reverse recovery characteristic.

11. The power factor correction converter according to claim 10 wherein the first switch circuit comprises a bidirectional switch.

12. The power factor correction converter according to claim 10 wherein the second switch circuit comprises a bidirectional switch.

13. The power factor correction converter according to claim 10 wherein the reverse recovery time of the rectifying diodes having a slow reverse recovery characteristic is longer than the double of the reverse recovery time of the rectifying diodes having a fast reverse recovery characteristic.

14. A power factor correction converter, comprising:
 a first power converter stage, comprising:
  a first boost inductor connected to an AC input terminal;
  a first switch circuit connected in series with the first boost inductor;
  a first series rectifier circuit having a junction node connected between the first boost inductor and the first switch circuit; and
  a second series rectifier circuit connected in parallel with the first series rectifier circuit and having a junction node connected to the first switch circuit;
 a second power converter stage, comprising:
  a second boost inductor coupled to the AC input terminal and connected in parallel with the first boost inductor;
  a second switch circuit connected in series with the second boost inductor;
  a third series rectifier circuit having a junction node connected between the second boost inductor and the second switch circuit; and
  a fourth series rectifier circuit connected in parallel with the third series rectifier circuit and having a junction node connected to the second switch circuit; and
 an output capacitor connected in parallel with the fourth series rectifier circuit;
 wherein the first series rectifier circuit and the third series rectifier circuit comprise rectifying diodes having a fast reverse recovery characteristic, and the second series rectifier circuit and the fourth series rectifier circuit comprise rectifying diodes having a slow reverse recovery characteristic.

15. The power factor correction converter according to claim 14 wherein the first switch circuit comprises a bidirectional switch.

16. The power factor correction converter according to claim 14 wherein the second switch circuit comprises a bidirectional switch.

17. The power factor correction converter according to claim 14 wherein the reverse recovery time of the rectifying diodes having a slow reverse recovery characteristic is longer than the double of the reverse recovery time of the rectifying diodes having a fast reverse recovery characteristic.

* * * * *